(12) United States Patent
Horikawa et al.

(10) Patent No.: US 7,609,595 B2
(45) Date of Patent: Oct. 27, 2009

(54) DEFINING FROM A FIRST RECORDING SPEED A SECOND RECORDING SPEED FOR RECORDING ON AN INFORMATION RECORDING MEDIUM

(75) Inventors: Kunihiko Horikawa, Saitama (JP); Hiroyuki Uchino, Saitama (JP); Shoji Taniguchi, Saitama (JP); Akira Shirota, Saitama (JP); Yoshio Sasaki, Saitama (JP); Eiji Muramatsu, Saitama (JP)

(73) Assignee: Pioneer Corporation, Tokyo (JP)

( * ) Notice: Subject to any disclaimer, the term of this patent is extended or adjusted under 35 U.S.C. 154(b) by 236 days.

(21) Appl. No.: 10/577,774

(22) PCT Filed: Sep. 29, 2004

(86) PCT No.: PCT/JP2004/014234
§ 371 (c)(1), (2), (4) Date: Jul. 28, 2006

(87) PCT Pub. No.: WO2005/043515
PCT Pub. Date: May 12, 2005

(65) Prior Publication Data
US 2007/0109934 A1    May 17, 2007

(30) Foreign Application Priority Data
Oct. 31, 2003   (JP) .............................. 2003-373817

(51) Int. Cl.
*G11B 7/00* (2006.01)
(52) U.S. Cl. ................................. 369/47.53; 369/59.11
(58) Field of Classification Search .............. 369/47.29, 369/47.41
See application file for complete search history.

(56) References Cited

U.S. PATENT DOCUMENTS

| 6,556,524 | B1 * | 4/2003 | Takeshita | 369/47.43 |
| 7,035,184 | B2 * | 4/2006 | Takeda | 369/47.39 |
| 2002/0024903 | A1 * | 2/2002 | Sato | 369/47.53 |
| 2002/0044507 | A1 * | 4/2002 | Hagiwara et al. | 369/47.4 |

(Continued)

FOREIGN PATENT DOCUMENTS

JP          3159454          2/2001

(Continued)

*Primary Examiner*—Peter Vincent Agustin
(74) *Attorney, Agent, or Firm*—Young & Thompson

(57) ABSTRACT

An information recording apparatus (300) is provided with: a recording device (352) for irradiating an information recording medium (100) with laser light and for recording information onto the information recording medium; an obtaining device (354) for obtaining at least one of (i) a special OPC strategy for defining a waveform of the laser light used to calculate an optimum laser power of the laser light for recording the information at a second recording speed different from a first recording speed, at the first recording speed, and (ii) a recording strategy for defining a waveform of the laser light used to record the information at the second recording speed; a power calculating device (354) for calculating the optimum laser power by using the special OPC strategy at the first recording speed; and a controlling device (354) for controlling said recording device to record the information at the second recording speed, by using the calculated optimum laser power and the recording strategy.

10 Claims, 8 Drawing Sheets

U.S. PATENT DOCUMENTS

| | | | |
|---|---|---|---|
| 2003/0021201 A1* | 1/2003 | Kobayashi | 369/47.39 |
| 2003/0058765 A1* | 3/2003 | Schreurs et al. | 369/47.53 |
| 2003/0086346 A1* | 5/2003 | Fukumoto | 369/47.53 |
| 2003/0123352 A1* | 7/2003 | Chen | 369/47.53 |
| 2004/0145993 A1* | 7/2004 | Kurebayashi et al. | 369/53.37 |

FOREIGN PATENT DOCUMENTS

| | | |
|---|---|---|
| JP | 2003-45036 | 2/2003 |
| JP | 2003-141728 | 5/2003 |
| JP | 2003-203341 | 7/2003 |

* cited by examiner

Recording pulse for 4x

Recording pulse for 8x

OPC pulse for 4x

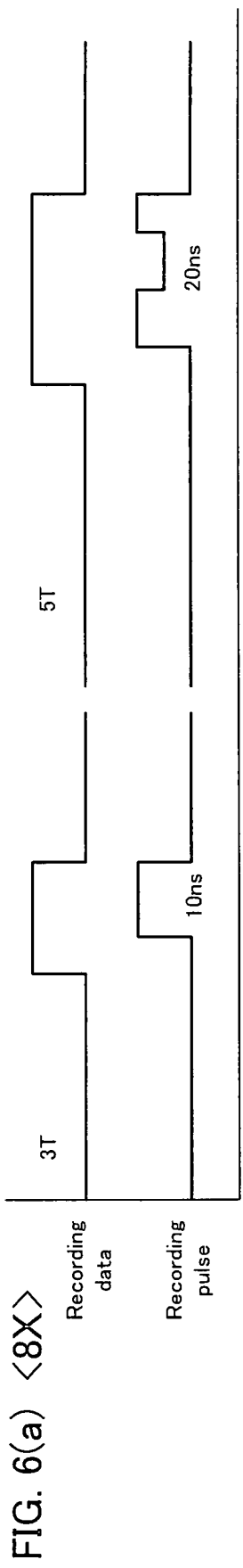
FIG. 6(a) ⟨8X⟩
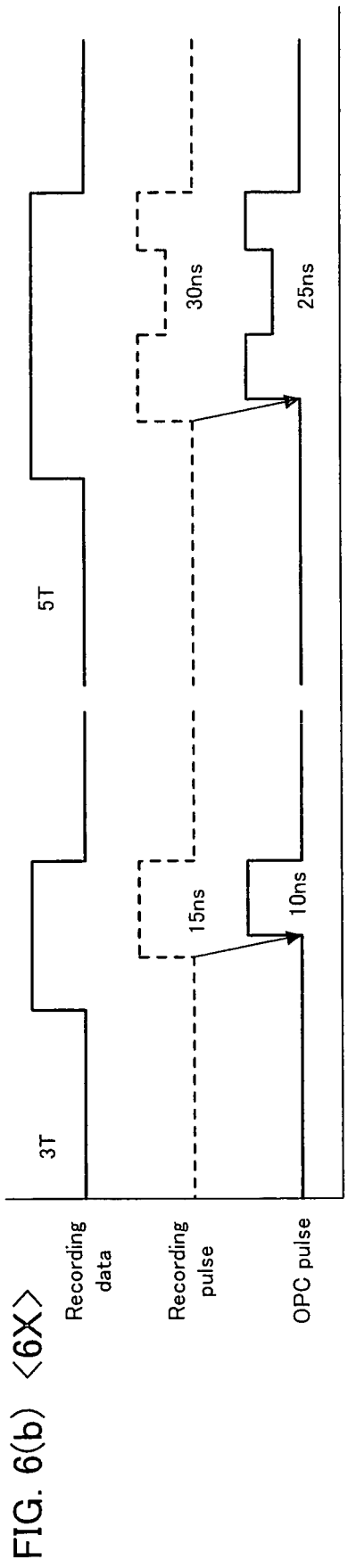
FIG. 6(b) ⟨6X⟩
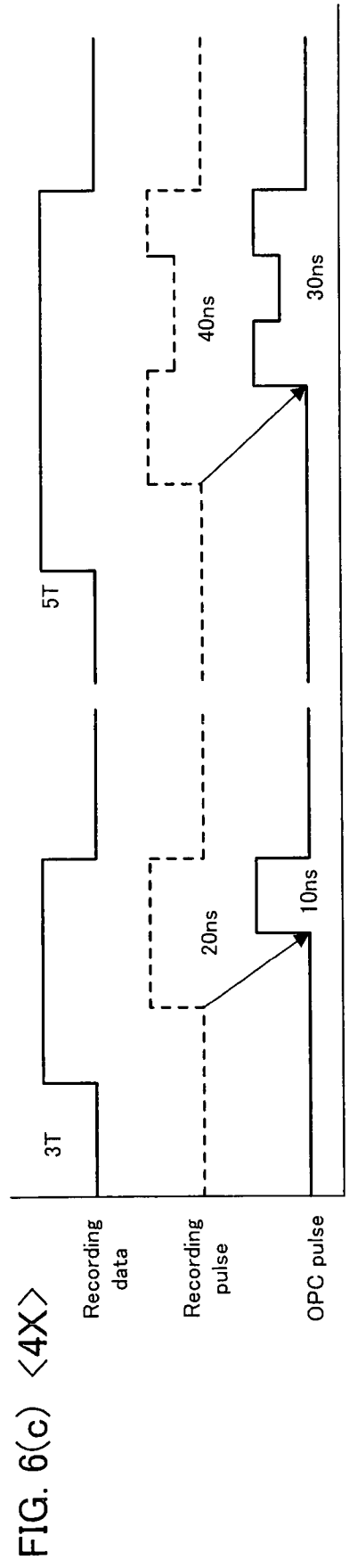
FIG. 6(c) ⟨4X⟩

DEFINING FROM A FIRST RECORDING SPEED A SECOND RECORDING SPEED FOR RECORDING ON AN INFORMATION RECORDING MEDIUM

TECHNICAL FIELD

The present invention relates to an information recording medium, such as a DVD, an information recording apparatus, such as a DVD recorder, an information recording method, and a computer program which makes a computer function as the information recording apparatus.

BACKGROUND ART

In an information recording/reproducing apparatus for recording information onto an information recording medium, such as an optical disc, for example, the optimum laser power of laser light used in a recording operation, for example, is set by an OPC (Optimum. Power Calibration) process, depending on the type of the optical disc, the type of the information recording/reproducing apparatus, recording speed and so on. That is, the calibration for the laser power is performed. By this, it is possible to realize an appropriate recording operation. For example, if the optical disc is loaded and a writing command is inputted, data for test writing is recorded into an OPC area, with sequentially changing the light intensity. A so-called test writing process is performed. Then, the data for test writing recorded in this manner is reproduced, and this reproduction result is judged by a predetermined estimation standard, to thereby set the optimum laser power.

On the other hand, there is also developed a technology of increasing the recording speed (or reproduction speed) of the information by increasing the rotational speed of the optical disc. For example, in a CD-ROM as one example of the optical disc, efforts are made to speed up the recording speed of data, such as 24 times speed and 48 times speed, with a higher rotational speed of the optical disc.

Patent document 1: Patent publication No. 3159454

DISCLOSURE OF INVENTION

Subject to be Solved by the Invention In the case in which the rotational speed of the optical disc is increased as described above, the OPC process is preferably performed at a linear velocity at which the data is actually recorded. However, since the OPC process is generally performed on the most inner circumferential side of the optical disc, it is most difficult to increase the linear velocity for the same rotational speed. Thus, there is such a technical problem that it is hardly possible to realize an actual linear velocity on the most inner circumferential side, due to constraints on the standard or physical constraints of a motor for controlling the rotation. In particular, in a CLV (Constant Linear Velocity) in which the linear velocity is constant even in an arbitrary recording area of the optical disc, the rotational speed on the most inner circumferential side is higher than that on the most outer circumferential side. Thus, in order to realize a recording speed or linear speed of 8 times speed in a DVD, as one specific example of the optical disc, for example, high-speed rotation, such as 12000 rpm, is required on the most inner circumferential side. It is difficult to realize such high-speed rotation on the standard of the motor, and moreover, there is such a technical problem that it causes damage or breakdown of the optical disc which rotates at the rotational speed. In addition, even if such high-speed rotation is realized, there is such a problem that a servo for controlling the motor becomes unstable, resulting in a lower detection accuracy of a β value, such as asymmetry.

In order to solve the problem, a technology of performing the OPC process at a low rotational speed and estimating the optimum laser power at the high rotational speed from its result is adopted in a CD-R as one specific example of the optical disc. However, in the DVD, for example, there is such a technical problem that it is difficult or impossible to highly accurately obtain the optimum laser power because a power margin is small due to its smaller recording pits than those in the CD-R, or for similar reasons.

On the other hand, it can be also considered that the above problem is solved by performing the OPC process on the most outer circumferential side of the optical disc. However, the most outer circumferential side is easily touched by a user with fingers or the like, in handling the optical disc, and moreover, it easily gets a scratch if it touches a loading-tray. Therefore, there is such a technical problem that even if the OPC process is performed on the most outer circumferential side having dirt and scratches or the like on a recording surface as described above, it is hardly possible to highly accurately obtain the optimum laser power.

In order to solve the above-mentioned conventional problems, it is therefore an object of the present invention to provide an information recording apparatus and an information recording method, which enable the calibration process of laser light, for example, to be properly performed even at the time of high-speed rotation, a computer program which realizes the information recording apparatus, and an information recording medium.

Means for Solving the Subject

The above object of the present invention can be achieved by a first information recording apparatus provided with: a recording device for irradiating an information recording medium with laser light and for recording information onto the information recording medium; an obtaining device for obtaining at least one of (i) a special OPC strategy for defining a waveform of the laser light used to calculate an optimum laser power of the laser light for recording the information at a second recording speed different from a first recording speed, at the first recording speed, and (ii) a recording strategy for defining a waveform of the laser light used to record the information at the second recording speed; a power calculating device for calculating the optimum laser power by using the special OPC strategy at the first recording speed; and a controlling device for controlling the recording device to record the information at the second recording speed, by using the calculated optimum laser power and the recording strategy.

The above object of the present invention can be also achieved by a second information recording apparatus provided with: a recording device for irradiating an information recording medium with laser light and for recording information onto the information recording medium; a first power calculating device for calculating, at a first recording speed, a first optimum laser power of the laser light for recording the information at the first recording speed, by using an usual OPC strategy for defining a waveform of the laser light used to record the information at the first recording speed; and a second power calculating device for calculating, at the first recording speed, a second optimum laser power, by using a special OPC strategy for defining a waveform of the laser light used to calculate the second optimum laser power of the laser light for recording the information at a second recording speed different from the first recording speed.

The above object of the present invention can be also achieved by a first information recording method provided with: a recording process of irradiating an information recording medium with laser light and of recording information onto the information recording medium; an obtaining process of obtaining at least one of (i) a special OPC strategy for defining a waveform of the laser light used to calculate an optimum laser power of the laser light for recording the information at a second recording speed different from a first recording speed, at the first recording speed, and (ii) a recording strategy for defining a waveform of the laser light used to record the information at the second recording speed; a power calculating process of calculating the optimum laser power by using the special OPC strategy at the first recording speed; and a controlling process of controlling the recording device to record the information at the second recording speed, by using the calculated optimum laser power and the recording strategy.

The above object of the present invention can be also achieved by a second information recording method provided with: a recording process of irradiating an information recording medium with laser light and of recording information onto the information recording medium; a first power calculating process of calculating, at a first recording speed, a first optimum laser power of the laser light for recording the information at the first recording speed, by using an usual OPC strategy for defining a waveform of the laser light used to record the information at the first recording speed; and a second power calculating process of calculating, at the first recording speed, a second optimum laser power, by using a special OPC strategy for defining a waveform of the laser light used to calculate the second optimum laser power of the laser light for recording the information at a second recording speed different from the first recording speed.

The above object of the present invention can be also achieved by a first computer program for record control to control a computer provided for the information recording apparatus according to claim 1, to make the computer function as at least one portion of the recording device, the obtaining device, the power calculating device and the controlling device.

The above object of the present invention can be also achieved by a second computer program for record control to control a computer provided for the information recording apparatus according to claim 1, to make the computer function as at least one portion of the recording device, the first power calculating device and the second power calculating device.

The above object of the present invention can be also achieved by a first information recording medium provided with: a data recording area to record therein information; and a control area to record therein at least one of (i) a special OPC strategy for defining a waveform of the laser light used to calculate an optimum laser power of the laser light for recording the information at a second recording speed different from a first recording speed, at the first recording speed, and (ii) a recording strategy for defining a waveform of the laser light used to record the information at the second recording speed.

The above object of the present invention can be also achieved by a second information recording medium provided with: a data recording area to record therein information; and a control area to record therein at least one of (i) an usual OPC strategy for defining a waveform of the laser light used to record the information at the first recording speed and (ii) a special OPC strategy for defining a waveform of the laser light used to calculate the second optimum laser power of the laser light for recording the information at a second recording speed different from the first recording speed.

These effects and other advantages of the present invention become more apparent from the following embodiments.

BRIEF DESCRIPTION OF DRAWINGS

FIG. 6 are explanatory views showing pulse waveforms of the laser beam corresponding to each strategy used by the information recording/reproducing apparatus in the example.

DESCRIPTION OF REFERENCE CODES

Figure 1:
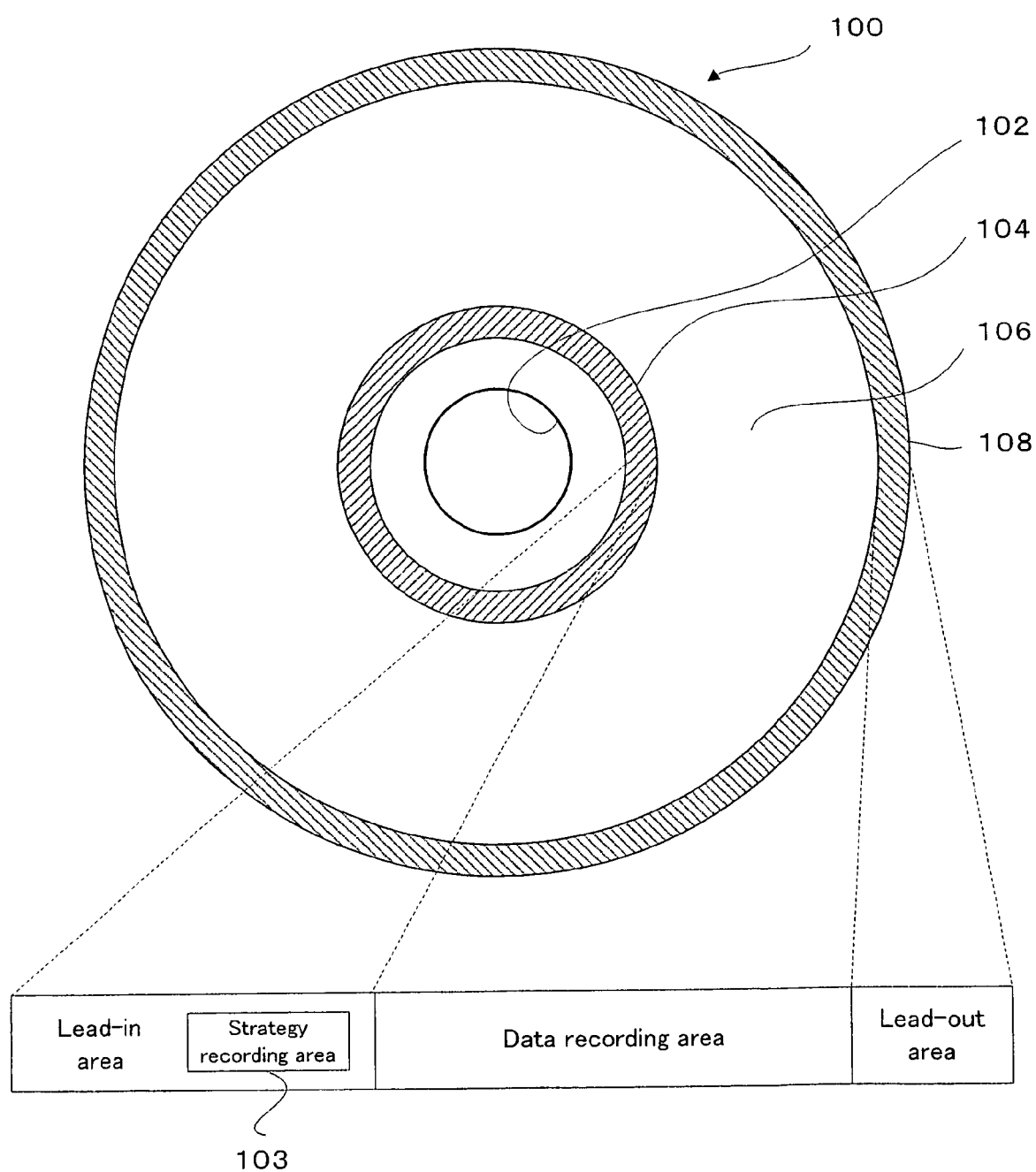
FIG. 1 is an explanatory view showing an example of the information recording medium of the present invention, wherein the upper side is a substantial plan view showing the optical disc having a plurality of areas and the corresponding lower side is a schematic conceptual view showing a recording area structure in the radial direction.

100 Optical disc
103 Strategy recording area
300 Information recording apparatus
352 Optical pickup
354 CPU
355 Memory

BEST MODE FOR CARRYING OUT THE INVENTION (Embodiment of Information Recording Apparatus)

A first embodiment according to the information recording apparatus of the present invention is provided with: a recording device for irradiating an information recording medium with laser light and for recording information onto the information recording medium; an obtaining device for obtaining at least one of (i) a special OPC strategy (e.g. a special OPC strategy for 4× and a special OPC strategy for 6× described later) for defining a waveform of the laser light used to calculate an optimum laser power of the laser light for recording the information at a second recording speed (e.g. a recording speed of 8× described later) different from a first recording speed (e.g. a recording speed of 4× described later), at the first recording speed, and (ii) a recording strategy (e.g. a recording strategy for 8× described later) for defining a waveform of the laser light used to record the information at the second recording speed; a power calculating device for calculating the optimum laser power by using the special OPC strategy at the first recording speed; and a controlling device for controlling the recording device to record the information at the second recording speed, by using the calculated optimum laser power and the recording strategy.

According to the first embodiment of the information recording apparatus of the present invention, by the operation of the recording device, it is possible to record the information including various contents, such as video information, music information, data information for a computer, or the like, onto the information recording medium in a disc shape having a spiral or concentric track, for example.

Particularly, the embodiment is constructed such that the obtaining device can obtain at least one of the recording strategy and the special OPC strategy. The recording strategy (e.g. the recording strategy for 8× described later) is control information for defining the waveform of the laser light (e.g. a pulse width, an amplitude, or the like, described later) used for recording the information at the second recording speed. Moreover, the special OPC strategy (e.g. the special OPC strategy for 4× or the special OPC strategy for 6× described later) is control information for defining the waveform of the laser light used for obtaining the optimum laser power of the laser light at the second recording speed. Namely, the special OPC strategy defines the waveform of the laser light which allows the optimum laser power for the second recording speed to be calculated even if the information, such as an OPC pattern, is recorded at the first recording speed. Here, the "optimum laser power" of the present invention is a wide concept not only literally indicating the most suitable laser power to the recording, but also including a laser power large enough to record the information more suitably upon the recording. More specifically, the optimum laser power is preferably such a laser power that asymmetry does not influence the recording operation, or that an error rate is 0 or substantially low enough not to influence the recording operation.

Then, the power calculating device uses the laser light defined by the special OPC strategy, and records the OPC pattern or the like at the first recording speed, to thereby calculate the optimum laser power for the second recording speed. The recording of the OPC pattern or the like is preferably performed by the recording device, under the control of the power calculating device. Then, by the operation of the controlling device, the recording device (particularly, the laser light thereof) is controlled to record the information with the calculated optimum laser power.

Explaining the advantage of the embodiment in more detail, it is not necessary to actually perform the OPC process at the second recording speed in order to calculate the optimum laser power for the second recording speed, and it is enough to record the information, such as the OPC pattern, at the first recording speed different from the second recording speed. In order to realize this, specifically, the special OPC strategy for defining the waveform of the laser light to calculate the optimum laser power at the second recording speed is used. Namely, a strategy different from the normal recording strategy, which is used for recording the information, such as contents, at the first recording speed, and different from the usual OPC strategy, described later, used for calculating the optimum laser power at the first recording speed, is used. Thus, even at the first recording speed different from the second recording speed, it is possible to obtain the optimum laser power for the second recording speed, properly and highly accurately. Therefore, regardless of the magnitude of the recording speed (e.g. whether the second recording speed is relatively high-speed or relatively low-speed), it is possible to calculate the optimum laser power for the second recording speed, by recording the information, such as the OPC pattern, at the first recording speed different from the second recording speed. In particular, even in the case in which the second recording speed cannot be realized, depending on the position (e.g. an inner circumferential side, an outer circumferential side, etc.) and the characteristics of the information recording medium, it is possible to calculate the optimum laser power at the first recording speed which can be realized. Namely, there is such a great advantage that it is possible to calculate the optimum laser power without consideration of constraints on the standard of a motor, the damage of the information recording medium, or the like.

Incidentally, as opposed to the embodiment, it is also possible to consider that the OPC pattern, for example, is recorded by using the usual OPC strategy used in the normal OPC at the first recording speed, and from its result, the optimum laser power for the second recording speed is predicted. However, since the normal usual OPC strategy is merely used, the recording characteristic or the like in recording the information at the second recording speed is not considered. Therefore, the laser power calculated in this manner often has a small or large degree of error, as compared to the original optimum laser power. However, according to the embodiment, the special OPC strategy having the above-mentioned characteristic is used, so that a possibility to produce such errors is low, and even if the OPC pattern or the like is recorded at the first recording speed, it is possible to calculate the optimum laser power for the second recording speed, extremely highly accurately. Namely, the information recording apparatus in the embodiment has a great advantage in the point that not the usual OPC strategy but the special OPC strategy, provided only for the calculation of the optimum laser power, can be used.

Consequently, according to the first embodiment of the information recording apparatus of the present invention, without actually recording the information at the second recording speed, it is possible to calculate the optimum laser power for the second recording speed, properly and highly accurately. Therefore, for example, even for the second recording speed which is relatively high-speed or relatively low-speed, as compared to the first recording speed, it is possible to properly calculate the optimum laser power.

Incidentally, the information recording apparatus in the embodiment can calculate the more accurate optimum laser power in the case in which the second recording speed is faster than the first recording speed, as described later. However, obviously, it is possible to receive the same benefits even in the case in which the second recording speed is slower than the first recording speed. Namely, it is possible to obtain the optimum laser power for the second recording speed, for example, by performing the OPC process at the first recording speed which is faster than the second recording speed at which the information is actually recorded. In addition, in this case, since the OPC pattern is recorded at the first recording speed which is relatively high-speed, there is also such an advantage that a time length required for the calculation of the optimum laser power can be reduced.

A second embodiment according to the information recording apparatus of the present invention is provided with: a recording device for irradiating an information recording medium with laser light and for recording information onto the information recording medium; a first power calculating device for calculating, at a first recording speed, a first optimum laser power of the laser light for recording the information at the first recording speed, by using an usual OPC strategy for defining a waveform of the laser light used to record the information at the first recording speed; and a second power calculating device for calculating, at the first recording speed, a second optimum laser power, by using a special OPC strategy for defining a waveform of the laser light used to calculate the second optimum laser power of the laser light for recording the information at a second recording speed different from the first recording speed.

According to the second embodiment of the information recording apparatus of the present invention, as in the above-mentioned information recording apparatus in the first embodiment, by the operation of the recording device, it is possible to record the information including the various contents onto the information recording medium.

Particularly in the second embodiment, by the operation of the first power calculating device, it is possible to calculate the first optimum laser power, which is an optimum laser power for recording the information at the first recording speed. Specifically, the usual OPC strategy is used to record the OPC pattern or the like, for example, at the first recording speed, to thereby calculate the first optimum laser power. Moreover, by the operation of the second power calculating device, it is possible to calculate the second optimum laser power, which is an optimum laser power for recording the information at the second recording speed. In particular, the second power calculating device uses the above-mentioned special OPC strategy to record the OPC pattern or the like, for example, at the first recording speed different from the second recording speed, to thereby calculate the second optimum laser power. Therefore, it is possible to receive the same benefits as those of the above-mentioned information recording apparatus in the first embodiment.

Consequently, according to the second embodiment of the information recording apparatus of the present invention, without actually recording the information at the second recording speed, it is possible to calculate the optimum laser power for the second recording speed, properly and highly accurately, as in the above-mentioned information recording apparatus in the first embodiment. Therefore, for example, even for the second recording speed which is relatively high-speed, as compared to the first recording speed, it is possible to properly calculate the optimum laser power.

In one aspect of the first embodiment of the information recording apparatus of the present invention, the power calculating device calculates the optimum laser power by recording a test-writing pattern for calculating the optimum laser power, and the special OPC strategy makes the waveform of the laser light for recording the test-writing pattern at the first recording speed, shorter than the waveform of the laser light for recording the information at the first recording speed.

According to this aspect, the power calculating device calculates the optimum laser power by recording the test-writing pattern, such as the OPC pattern, for example, at the first recording speed. In this case, the waveform of the laser light for recording the test-writing pattern is shorter than the waveform of the laser light for recording the information such as normal contents at the same recording speed. Thus, it is possible to record the test-writing pattern at the first recording speed, by using the waveform which is the same as or approximate to the waveform for recording the information at the second recording speed, which is relatively high-speed or relatively low-speed. Therefore, even if the information is recorded at the first recording speed, it is possible to realize the same or substantially the same recording characteristic (or laser power, laser light characteristics, etc.) as the case in which the information is recorded at the second recording speed. Therefore, the information, such as the OPC pattern, is recorded at the first recording speed by using such a special OPC strategy. By this, it is possible to obtain the optimum laser power for the second recording speed, highly accurately.

Of course, even in the second embodiment of the information recording apparatus of the present invention, in the same manner, the second power calculating device may calculate the second optimum laser power by recording a test-writing pattern for calculating the second optimum laser power, and the special OPC strategy may make the waveform of the laser light for recording the test-writing pattern at the first recording speed, shorter than the waveform of the laser light for recording the information at the first recording speed.

In an aspect of the information recording apparatus in which the test-writing pattern is written as described above, the special OPC strategy may make a percentage to shorten the waveform of the laser light for recording the test-writing pattern having a relatively short length, larger than a percentage to shorten the waveform of the laser light for recording the test-writing pattern having a relatively long length, on the basis of a length of the test-writing pattern recorded on the information recording medium.

According to this aspect, it is possible to approximate the result of the OPC process at the first recording speed, to the result under the assumption that the OPC process is actually performed at the second recording speed, as described above. Therefore, it is possible to calculate the optimum laser power for the second recording speed, more highly accurately.

In another aspect of the first or second embodiment of the information recording apparatus of the present invention, the second recording speed is faster than the first recording speed.

According to this aspect, it is possible to properly calculate the optimum laser power for recording the information at the recording speed that cannot be obtained by actually operating the information recording medium. In particular, in the information recording medium in a disc shape, such as a DVD and a CD, it is sometimes hardly possible to realize the rotational speed (e.g. the second recording speed) for actually recording the information, at the most inner circumferential side where the OPC process is performed, for example. According to this aspect, however, there is such a great advantage that it is possible to properly calculate the optimum laser power for recording the information at the second recording speed, by rotating the information recording medium at the rotational speed that realizes the first recording speed which is relatively slower than the second recording speed.

In another aspect of the first embodiment of the information recording apparatus of the present invention, an amplitude of the waveform defined by the special OPC strategy is the same as an amplitude of the waveform defined by the recording strategy.

According to this aspect, it is possible to calculate the optimum laser power which is more highly accurate and which is resulted from consideration of the characteristics when the information is recorded at the second recording speed.

In another aspect of the first embodiment of the information recording apparatus of the present invention, it is provided with a storing device for storing at least one of the special OPC strategy and the recording strategy.

According to this aspect, the obtaining device can obtain the special OPC strategy or the recording strategy stored in the storing device, relatively easily. In particular, since the special OPC strategy or the recording strategy is stored in the storing device, it is possible to receive the above-mentioned various benefits without relying on the information recording medium. Incidentally, if the special OPC strategy and the recording strategy vary depending on the type of the information recording medium, at least one of the special OPC strategy and the recording strategy is preferably stored in accordance with each type.

Of course, even in another aspect of the second embodiment of the information recording apparatus of the present invention, it may be provided with a storing device for storing at least one of the special OPC strategy and the recording strategy.

In another aspect of the first embodiment of the information recording apparatus of the present invention, at least one of the special OPC strategy and the recording strategy is recorded on the information recording medium.

According to this aspect, the obtaining device can obtain the special OPC strategy or the recording strategy recorded on the information recording medium, relatively easily. In particular, since the special OPC strategy or the recording strategy is recorded on the information recording medium, it is possible to receive the above-mentioned various benefits, regardless of whether or not the information recording apparatus itself has these strategies.

Of course, even in another aspect of the second embodiment of the information recording apparatus of the present invention, at least one of the special OPC strategy and the recording strategy may be recorded on the information recording medium.

(Embodiment of Information Recording Method)

According to each embodiment of the above-mentioned information recording method of the present invention, as in the above-mentioned embodiment according to the information recording apparatus of the present invention, it is possible to calculate the optimum laser power in the calculating process, by using the special OPC strategy obtained in the obtaining process. Then, it is possible to control the power of the laser light in the controlling process, and record the information with the optimum laser power in the recording process. In particular, as described above, it is possible to obtain the optimum laser power for the second recording speed, by recording the OPC pattern or the like, for example, at the first recording speed. Thus, even at the time of high-speed recording operation (e.g. even at the time of high-speed rotation), it is possible to properly perform the calibration process for the laser light.

Incidentally, in response to the various aspects of the above-mentioned each embodiment of the information recording apparatus of the present invention, each embodiment of the information recording method of the present invention can also adopt various aspects.

(Embodiment of Computer Program)

According to each embodiment of the above-mentioned computer program of the present invention, the above-mentioned first or second embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned each embodiment of the information recording apparatus of the present invention, each embodiment of the computer program of the present invention can also adopt various aspects.

The above object of the present invention can be also achieved by a first embodiment of a computer program product in a computer-readable medium for tangibly embodying a program of instructions executable by a computer, to make the computer function as at least one portion of the recording device, the obtaining device, the power calculating device, and the controlling device.

The above object of the present invention can be also achieved by a second embodiment of a computer program product in a computer-readable medium for tangibly embodying a program of instructions executable by a computer, to make the computer function as at least one portion of the recording device, the first power calculating device, and the second power calculating device.

According to the first or second embodiment of the computer program product of the present invention, at least one portion of the above-mentioned the recording device, the obtaining device, the power calculating device, the controlling device, the first power calculating device, and the second power calculating device of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the above-mentioned the recording device, the obtaining device, the power calculating device, the controlling device, the first power calculating device, and the second power calculating device of the present invention.

(Embodiment of Information Recording Medium)

According to each embodiment of the above-mentioned information recording medium of the present invention, in the data recording area, the information including various contents, such as video information, music information, data information for a computer, or the like, is recorded. Then, in the control area, the special OPC strategy and the recording strategy described above are recorded. Therefore, the information recording apparatus, such as a DVD recorder, reads the special OPC strategy and the recording strategy recorded in the control area. By this, it is possible to receive the various benefits owned by the above-mentioned information recording apparatus in the first or second embodiment, relatively easily.

These effects and other advantages of the present invention become more apparent from the following examples.

As explained above, according to the first embodiment of the information recording apparatus or method of the present invention, it is provided with: the recording device; the obtaining device; the power calculating device; and the controlling device, or the recording process; the obtaining process; the power calculating device; and the controlling process. Moreover, according to the second embodiment of the information recording apparatus or method of the present invention, it is provided with: the recording device; the first power calculating device; and the second power calculating device, or the recording process; the first power calculating process; and the second power calculating process. Therefore, without actually recording the information at the second recording speed, it is possible to calculate the optimum laser power for the second recording speed, properly and highly accurately. By this, even for the second recording speed which is relatively high-speed, it is possible to properly calculate the optimum laser power.

According to the embodiments of the information recording medium of the present invention, it is provided with: the data recording area; and the controlling area. Therefore, it enables the information recording apparatus to receive the above-mentioned various benefits.

EXAMPLES

Hereinafter, examples of the present invention will be discussed with reference to the drawings.

Incidentally, in the explanation below, the recording speed of recording data onto an optical disc is expressed by 4×, 6×, and 8×, with a constant × as a predetermined reference value. Namely, the recording speed expressed by 8× indicates about twice as much as the recording speed expressed by 4×. This reference value × may be determined from the standards of a drive and the optical disc or the like, or may be arbitrarily determined by a maker of the information recording/reproducing apparatus or the like. In the description below, an explanation will be made under the assumption that there are three types of recording speeds, 4×, 6×, and 8×, as the recording speed of an optical disc 100. Then, one specific example of the "first recording speed" of the present invention corresponds to the "recording speed of 4×" or the "recording speed of 6×" in the examples, and one specific example of the "second recording speed" of the present invention corresponds to the "recording speed of 8×".

Moreover, various strategies, which appear frequently in the description below, are now simply explained. A "recording strategy for l× (l=4, 6, 8)" is strategy information used to control the waveform or the like of a laser beam for recording various data, including normal contents or the like, at a recording speed of l×. Namely, it corresponds to one specific example of the "recording strategy" of the present invention.

A "special OPC strategy for m× (m=4, 6)" is strategy information used to control the waveform or the like of the laser beam in recording an OPC pattern, as described later, at a recording speed of m×, in order to calculate the optimum recording speed for the recording speed of 8×. Namely, it corresponds to one specific example of the "special OPC strategy" of the present invention.

A "usual OPC strategy for n× (n=4, 6)" is strategy information used to control the waveform or the like of the laser beam in recording the OPC pattern, as described later, at a recording speed of n×, in order to calculate the optimum recording speed for the recording speed of n×. Namely, it corresponds to one specific example of the "usual OPC strategy" of the present invention.

(Example of Information Recording Medium)

At first, with reference to FIG. 1, an optical disc, as an example according to the information recording medium of the present invention, will be discussed. In FIG. 1, the upper side is a substantial plan view showing the optical disc having a plurality of areas and the corresponding lower side is a schematic conceptual view showing a recording area structure in the radial direction.

As shown in FIG. 1, on an optical disc 100, recording (writing) can be performed a plurality of times or once, in various recording methods, such as a magneto optical method and a phase change method. The optical disc 100 has a recording surface on a disc main body with a diameter of about 12 cm, as is a DVD. On the recording surface, the optical disc 100 is provided with: a lead-in area 104; a data recording area 106; and a lead-out area 108, from the inner circumference to the outer circumference, centered on a center hole 102. Then, in each recording area, groove tracks and land tracks are alternately provided, spirally or concentrically, centered on the center hole 102. The groove tracks may be wobbled, or pre-pits may be formed on one of or both of the tracks.

Incidentally, the present invention is not particularly limited to the optical disc having these three areas. For example, even if the lead-in area 104 or the lead-out area 108 does not exist, a file structure explained below can be constructed. Moreover, as described later, the lead-in area 104 and the lead-out area 108 may be further segmentized.

Particularly in the example, as shown in the lower part of FIG. 1, a strategy recording area 103, as one specific example of the "control area" of the present invention, is disposed in the lead-in area 104. In the strategy recording area 103, a recording strategy for 8× described later and a special OPC strategy for 4× (or a special OPC strategy for 6×) are recorded. The recording strategy for 8× is control information to control the waveform or the like of the laser beam for recording the data at the recording speed of 8×. The special OPC strategy for 4× is control information to control the waveform or the like of the laser beam in recording an OPC pattern at the recording speed of 4×, in order to calculate the optimum recording speed for the recording speed of 8×. The special OPC strategy for 6× is control information to control the waveform or the like of the laser beam in recording the OPC pattern at the recording speed of 6×, in order to calculate the optimum recording speed for the recording speed of 8×.

In addition, there are recorded a recording strategy for 4×, which is to control the waveform or the like of the laser beam for recording the data at the recording speed of 4×, and a recording strategy for 6×, which is to control the waveform or the like of the laser beam for recording the data at the recording speed of 6×. Moreover, there are recorded a usual OPC strategy for 4×, which is to control the waveform or the like of the laser beam in recording the OPC pattern at the recording speed of 4×, in order to calculate the optimum recording speed for the recording speed of 4×, and a usual OPC strategy for 6×, which is to control the waveform or the like of the laser beam in recording the OPC pattern at the recording speed of 6×, in order to calculate the optimum recording speed for the recording speed of 6×.

Then, these strategies may be recorded by a land pre-pit (LPP) formed on the land track, or may be recorded as data (or a file). In particular, if recorded as the data, the strategies can be recorded again, as occasion demands. The strategy recording area 103 may be disposed in the data recording area 106 or the lead-out area 108 even if it is not disposed in the lead-in area 104.

(Example of Information Recording/Reproducing Apparatus)

Next, with reference to FIG. 2 to FIG. 8, an example according to the information recording apparatus of the present invention will be discussed.

Figure 2:
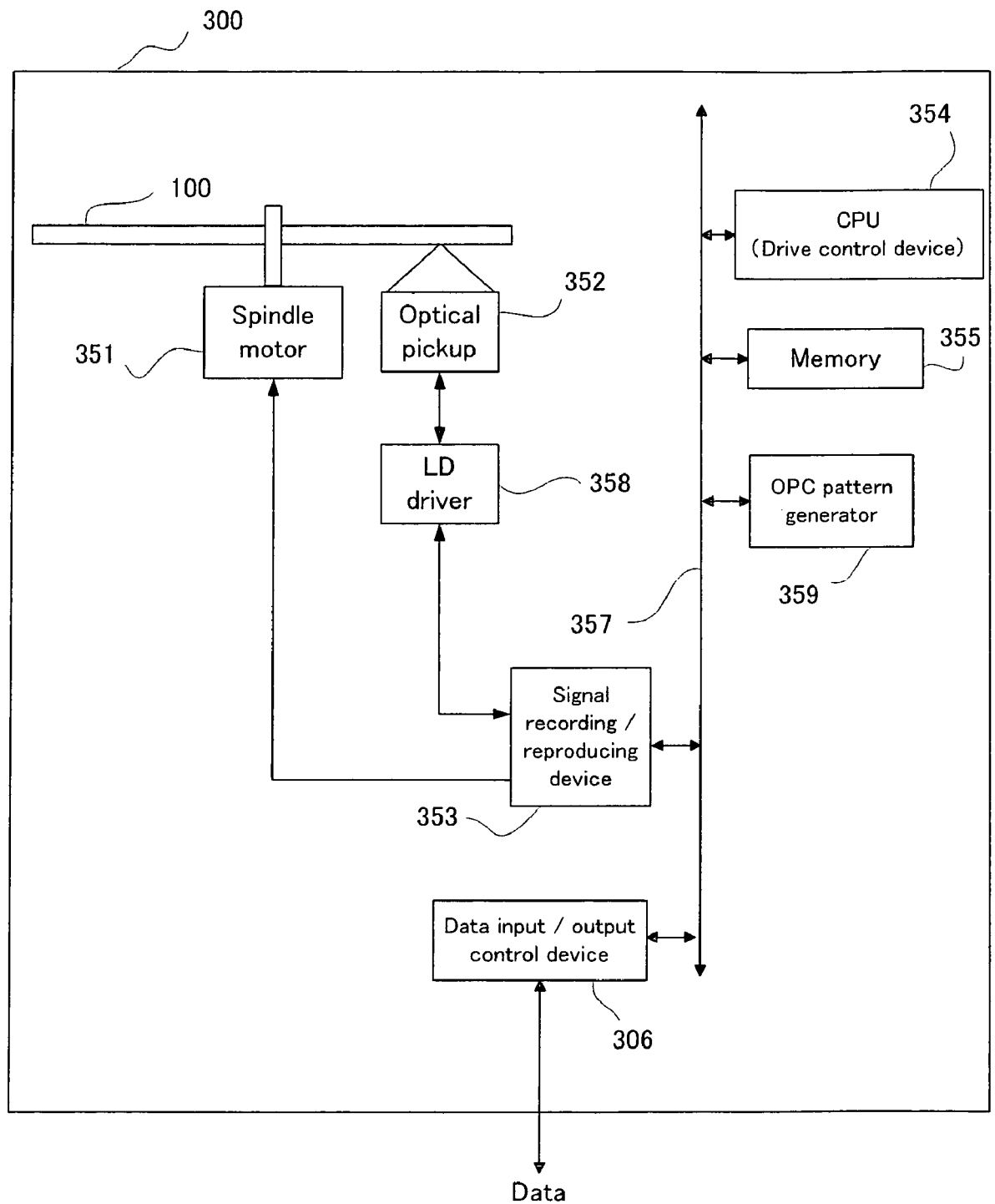
FIG. 2 is a block diagram showing an information recording/reproducing apparatus in the example of the present invention.

At first, with reference to FIG. 2, the structure of an information recording/reproducing apparatus 300 in the example of the present invention will be discussed. FIG. 2 is a block diagram showing the information recording/reproducing apparatus 300 in the example of the present invention. Incidentally, the information recording/reproducing apparatus 300 has a function of recording the record data onto the optical disc 100 and a function of reproducing the record data recorded on the optical disc 100. Namely, this example shows not only the example of the information recording/reproducing apparatus, but also each of an example of an information recording apparatus and an example of an information reproducing apparatus.

With reference to FIG. 2, the inner structure of the information recording/reproducing apparatus 300 will be discussed. The information recording/reproducing apparatus 300 is an apparatus for recording information onto the optical disc 100 and for reading the information recorded on the optical disc 100.

The information recording/reproducing apparatus 300 is provided with: a spindle motor 351; an optical pickup 352; a signal recording/reproducing device 353; a CPU (drive control device) 354; a memory 355; and a bus 357.

The spindle motor 351 is intended to rotate and stop the optical disc 100, and operates in accessing the optical disc 100. More specifically, the spindle motor 351 is constructed to rotate and stop the optical disc 100 at a predetermined speed under spindle servo by a not-illustrated servo unit or the like.

If the data is recorded at the recording speed of 8×, the spindle motor 351 operates such that the optical disc 100 rotates at a higher speed, as compared to the case in which the data is recorded at the recording speed of 4× or 6×. If the data is recorded at the recording speed of 6×, the spindle motor 351 operates such that the optical disc 100 rotates at a higher speed, as compared to the case where the data is recorded at the recording speed of 4×.

The optical pickup 352 is intended to perform the recording/reproducing with respect to the optical disc 100, and is provided with a laser device (e.g. a laser diode), a lens and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 performs the recording with respect to the optical disc 100 by controlling the spindle motor 351 and the optical pickup 352.

The memory 355 is used in the whole data processing on the disc drive 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as these recording devices; a buffer used for compression/decompression of video data; a Random Access Memory (RAM) area into which a parameter required for the operation of a program or the like is stored; and the like.

Particularly in the example, in the memory 355, the recording strategy for 8× (or the recording strategy for 4× and the recording strategy for 6×), the special OPC strategy for 4×, the special OPC strategy for 6×, or other various strategies may be recorded or stored.

The CPU (drive control device) 354 is connected to the signal recording/reproducing device 353 and the memory 355 via the bus 357, and controls the entire operation of the information recording/reproducing apparatus 300 by giving an instruction to each control device. In general, software for operating the CPU 354 is stored in the memory 355.

A LD driver 358 oscillates the laser diode or the like of the optical pickup 352 at a predetermined frequency, to thereby control the laser beam irradiated from the optical pickup 352.

An OPC pattern generator 359 is used to generate a predetermined OPC pattern, by using various strategies described later (particularly, the special OPC strategy for m×, the usual OPC strategy for n×, etc.).

A data input/output control device 356 controls the input/output of the data from the exterior with respect to the information recording/reproducing apparatus 300, to thereby perform storage into the data buffer on the memory 355 and export therefrom.

Figure 3:
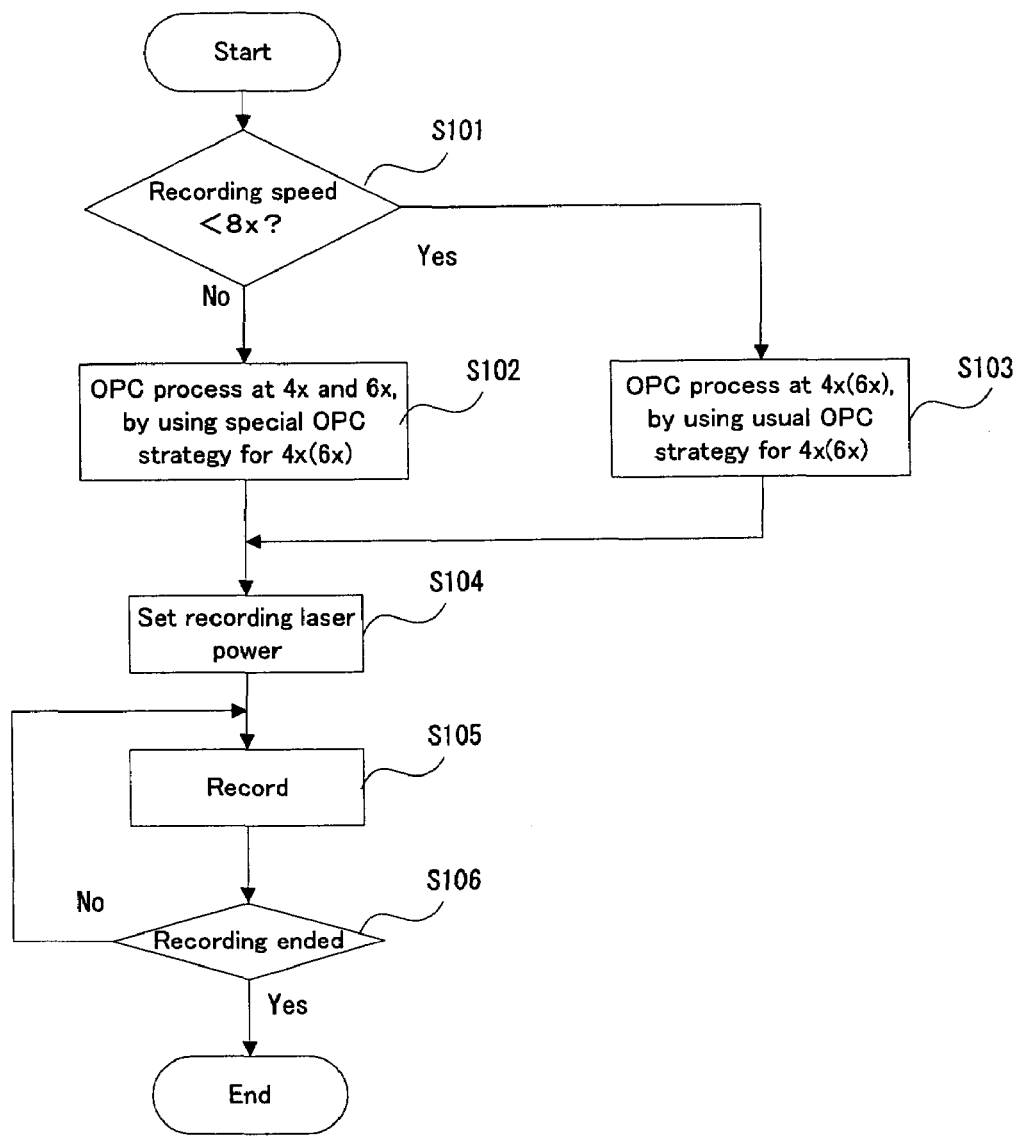
FIG. 3 is a flowchart showing a flow of the basic operation of the information recording/reproducing apparatus in the example.
Figure 4:
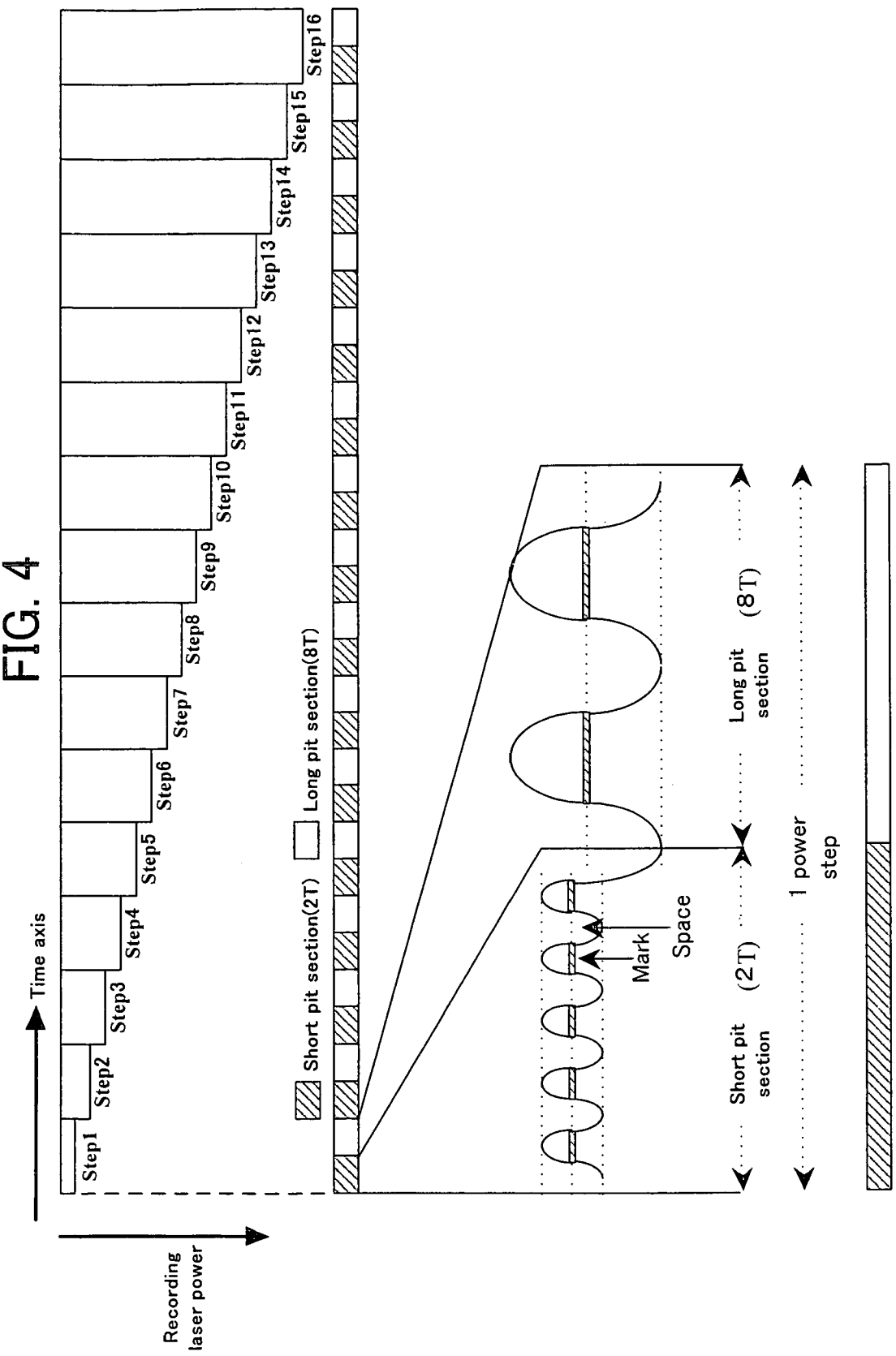
FIG. 4 is a schematic timing chart showing one OPC process in the case of 16 power steps in the information recording/reproducing apparatus in the example.

Next, with reference to FIG. 3 and FIG. 4, the basic operation of the information recording apparatus of the present invention will be discussed. FIG. 3 is a flowchart showing a flow of the basic operation of the information recording apparatus in the example. FIG. 4 is a schematic timing chart showing one OPC process in the case of 16 power steps.

As shown in FIG. 3, under the control of the CPU 354, it is judged whether or not a speed of recording the data onto the optical disc 100 is less than 8× (step S101). Here, it is preferably constructed such that it is possible to judge what numerical value is shown as the recording speed.

As a result of the judgment, if it is judged that the recording speed is less than 8× (i.e. if it is 4× or 6×) (the step S101: Yes), the optimum laser power corresponding to each recording speed is calculated in the OPC process (step s103) Specifically, if it is judged the recording speed is 4×, the optical disc 100 is rotated to realize the recording speed of 4×, and the usual OPC strategy for 4× is used to perform the OPC process. If it is judged the recording speed is 6×, the optical disc 100 is rotated to realize the recording speed of 6×, and the usual OPC strategy for 6× is used to perform the OPC process.

The usual OPC strategy for 4× (or the usual OPC strategy for 6×) may be obtained from the strategy recording area 103 in the lead-in area 104, or from the memory 355 or the like which is provided for the information recording/reproducing apparatus 300.

Here, the OPC process is discussed in more detail. At first, under the control of the CPU 354, the optical pickup 351 is displaced to the OPC area disposed in the lead-in area 104. Then, by the operations of the OPC pattern generator 359 and the LD driver 358 or the like, the recording laser power (e.g. mutually different 16 step recording laser power) is changed sequentially in stages, and the OPC pattern is recorded into the OPC area. For example, a recording pattern in which a short pit (mark) corresponding to a 2T pulse and a long pit (mark) corresponding to 8T pulse are alternately formed with respective non-recording sections (spaces), which have the same length as the short pulse or the long pulse, is taken as one example. In the example, as the waveform of the laser beam at this time, a waveform defined by the usual OPC strategy for 4× (or the usual OPC strategy for 6×) is used, to thereby record the predetermined OPC pattern different from a reference pattern.

The LD driver 358 drives a semiconductor laser in the optical pickup 352, in order to change the laser power sequentially in stages, in accordance with the OPC pattern outputted from the OPC pattern generator 359.

Moreover, after the completion of the test-writing into the OPC area, the OPC pattern test-written in the OPC area is reproduced, under the control of the CPU 354. Then, by a RF signal inputted to a not-illustrated envelope detector, the peak value and the bottom value of the envelope detection of the RF signal are sampled. Then, such reproduction of the OPC pattern is performed in accordance with the number of times that the OPC pattern is recorded, in one OPC process, the optimum laser power is determined. Namely, the optimum laser power which approximately minimizes a jitter value, representing the quality of a recording characteristic, is calculated from the asymmetry obtained from the peak value and the bottom value.

On the other hand, as a result of the judgment in the step S101, if the recording speed is not less than 8× (i.e. if it is 8×) (the step S101: No), the OPC process is performed by using the special OPC strategy for 4× and the special OPC strategy for 6×, and the optimum laser power for the recording speed of 8× is calculated by the operation of the CPU 354, which is one specific example of the "power calculating device" of the present invention (step S102). It may be constructed such that the special OPC strategy for 4× and the special OPC strategy for 6× are obtained from the strategy recording area 103 of the optical disc 100 under the control of the CPU 354, which is one specific example of the "obtaining device" of the present invention. Alternatively, it may be also constructed such that the strategies are obtained from the memory 355 if recorded in the memory 355.

Here, the various strategies used in the operations described above and the waveforms of the laser beam defined by the strategies are discussed in more detail, with reference to FIG. 5 and FIG. 6. FIG. 5 are explanatory views showing pulse waveforms of the laser beam irradiated from the optical pickup. FIG. 6 are explanatory views showing pulse waveforms of the laser beam corresponding to each strategy.

At first, with reference to FIG. 5, the waveforms of the laser beam irradiated by the special OPC strategy for 4× used in the OPC process, and as the comparison, the recording strategy for 4× used in the normal recording operation and the recording strategy for 8× are discussed.

Figure 5A:
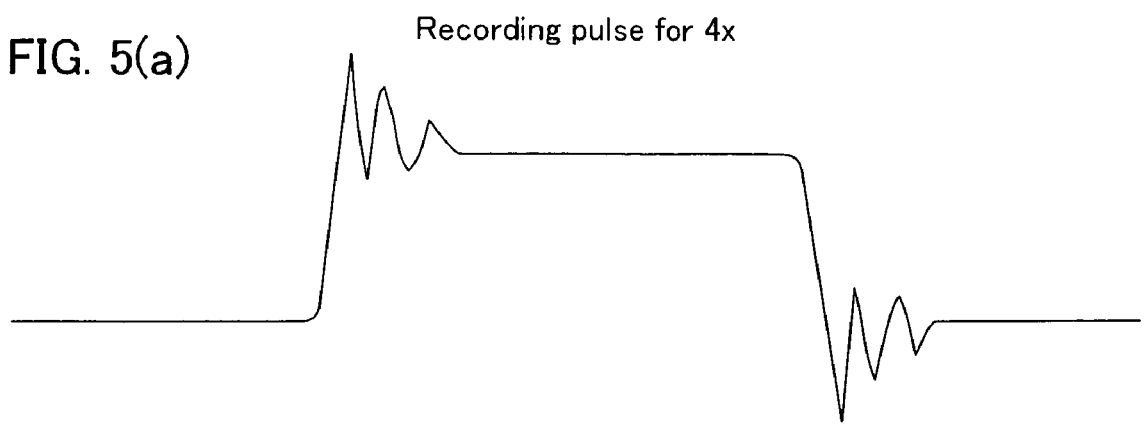
FIG. 5 are explanatory views showing pulse waveforms of a laser beam irradiated or emitted from an optical pickup of the information recording/reproducing apparatus in the example.

As shown in FIG. 5(a), the waveform of the laser beam defined by the recording strategy for 4× has a waveform which oscillates at the leading edge and the trailing edge of the pulse. Such a waveform oscillating at the leading edge and the trailing edge is caused by a difference in characteristics of the information recording/reproducing apparatus 300, deterioration by a secular change of the optical pickup 352 and a difference in the emitting power of the laser beam. Then, the information recording/reproducing apparatus 300 can record predetermined data onto the optical disc 100 at the recording speed of 4×, by using the waveform of the laser beam shown in FIG. 5(a).

Figure 5B:
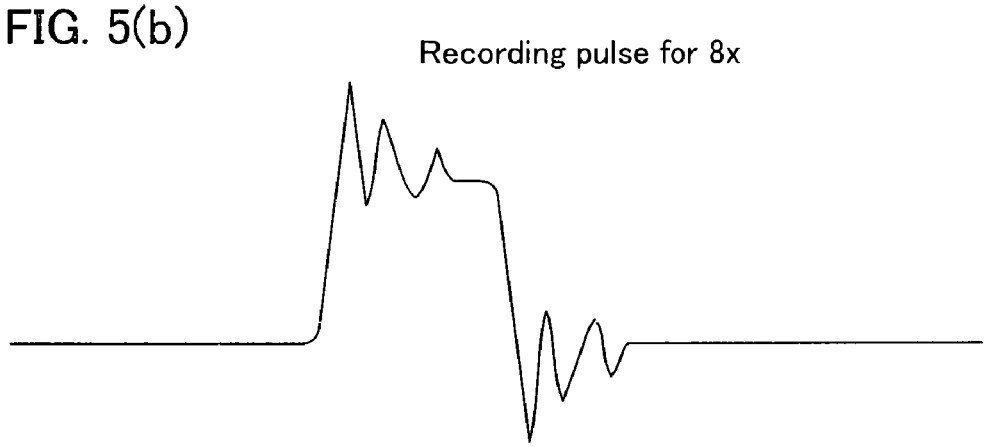

In contrast, in order to record the same data as the data recorded by using the pulse shown in FIG. 5(a) onto the optical disc 100 at the recording speed of 8×, the pulse waveform of the laser beam defined by the recording strategy for 8× shown in FIG. 5(b) is used. The pulse shown in FIG. 5(b) has such a waveform that the pulse shown in FIG. 5(a) is halved on a time axis. This results from the following fact. Since the recording speed of 8× is about twice as much as the recording speed of 4×, in the case of 8×, the rotational speed (or the linear velocity in a predetermined recording area) of the optical disc is also about twice as much as the case of 4×. Therefore, about half as much suffices for the irradiation of the laser beam required for the formation of the same pit.

Similarly, the recording strategy for 6× used in recording the data at the recording speed of 6×, which is not illustrated, has a waveform with a shorted pulse width than that of the pulse waveform shown in FIG. 5(a) and with a longer pulse width than that of the pulse waveform shown in FIG. 5(b). Then, the information recording apparatus 300 in the example records the data at the recording speed of 4×, 6× or 8×, by using the laser beam defined by the various recording strategies. In addition, the optimum laser power for the recording speed of 4× is calculated by recording the OPC pattern using the laser beam defined by the usual OPC strategy for 4×. The optimum laser power for the recording speed of 6× is calculated by recording the OPC pattern using the laser beam defined by the usual OPC strategy for 6×.

Figure 5C:
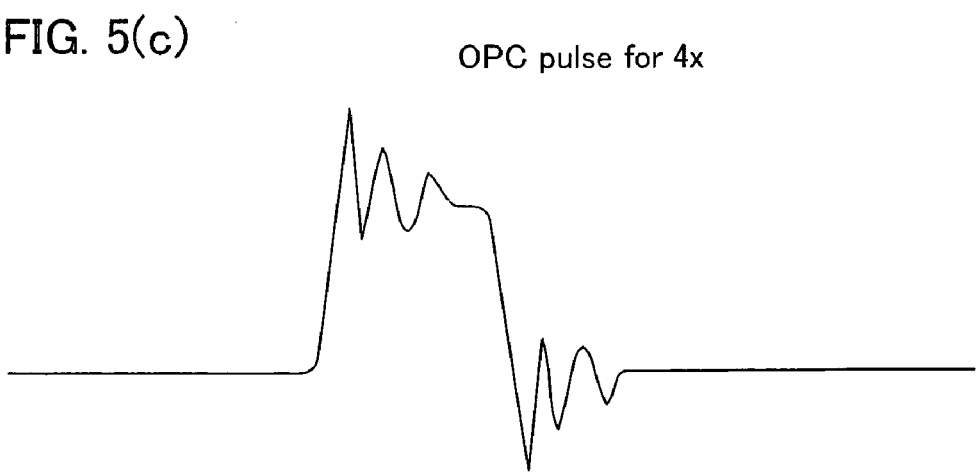

On the other hand, in calculating the optimum laser beam for the recording speed of 8×, the information recording apparatus 300 in the example does not have to use the laser beam defined by the recording strategy for 8× as shown in FIG. 5(b) to record the OPC pattern. In the example, in calculating the optimum laser power for the recording speed of 8×, the pulse waveform of the laser beam defined by the special OPC strategy for 4× shown in FIG. 5(c) is used, and the OPC pattern is recorded at the recording speed of 4×. Namely, the OPC process is performed by using the pulse waveform with a shorter pulse width than that of the original recording strategy for 4× (or the pulse waveform in substantially the same shape as that of the recording strategy for 8×).

The pulse waveform used in the OPC process, i.e. the special OPC strategy for 4× and the special OPC strategy for 6×, will be discussed in more detail with reference to FIG. 6.

As shown in a graph on the left in FIG. 6(a), when the data of a "3T pattern" is recorded onto the optical disc 100 at the recording speed of 8×, the laser beam corresponding to a 10 ns pulse is irradiated. Moreover, when the data of a "5T pattern" is recorded, the laser beam corresponding to a 20 ns pulse is irradiated, as shown in a graph on the right in FIG. 6(a). The shapes of these pulses are defined on the basis of the recording strategy for 8×, under the control of the CPU 354, for example.

As shown in a graph in the middle left in FIG. 6(b), when the data of the "3T pattern" is recorded onto the optical disc 100 at the recording speed of 6×, the laser beam corresponding to a 15 ns pulse is irradiated. Moreover, when the data of the "5T pattern" is recorded, the laser beam corresponding to a 30 ns pulse is irradiated, as shown in a graph in the middle right in FIG. 6(b). The shapes of these pulses are defined on the basis of the recording strategy for 6×, under the control of the CPU 354, for example.

In contrast, in the case in which the OPC pattern of the "3T pattern" is recorded at the recording speed of 6× in order to calculate the optimum laser power for the recording speed of 8×, the laser beam corresponding to the 10 ns pulse is irradiated on the basis of the special OPC strategy for 6×, as shown in the lower left in FIG. 6(b). Namely, the pulse having the same shape as the pulse in recording the "3T pattern" at the recording speed of 8× is irradiated. On the other hand, when the OPC pattern of the "5T pattern" is recorded at the recording speed of 6×, the laser beam corresponding to a 25 ns pulse is irradiated, as shown in the lower right in FIG. 6(b). The pulse width at this time is longer than the pulse in recording the data of the "5T pattern" at the recording speed of 8×.

As shown in a graph in the middle left in FIG. 6(c), when the data of the "3T pattern" is recorded onto the optical disc 100 at the recording speed of 4×, the laser beam corresponding to the 20 ns pulse is irradiated. Moreover, when the data of the "5T pattern" is recorded, the laser beam corresponding to a 40 ns pulse is irradiated as shown in the middle right in FIG. 6(c). The shapes of these pulses are defined on the basis of the recording strategy for 4×, under the control of the CPU 354, for example.

In contrast, in the case in which the OPC pattern of the "3T pattern" is recorded at the recording speed of 4× in order to calculate the optimum laser power for the recording speed of 8×, the laser beam corresponding to the 10 ns pulse is irradiated on the basis of the special OPC strategy for 6×, as shown in the lower left in FIG. 6(c). Namely, the pulse having the same shape as the pulse in recording the "3T pattern" at the recording speed of 8× is irradiated. On the other hand, when the OPC pattern of the "5T pattern" is recorded at the recording speed of 4×, the laser beam corresponding to a 30 ns pulse is irradiated, as shown in the lower right in FIG. 6(c). The pulse width at this time is longer than the pulse in recording the data of the "5T pattern" at the recording speed of 8×.

As explained above, when the optimum laser power for the recording speed of 8× is calculated by using the special OPC strategy for 4× and the special OPC strategy for 6×, the OPC pattern is recorded by irradiating the laser beam with a shorter pulse than the pulse of the laser beam which is defined by the recording strategy for 4× or the recording strategy for 6×, originally used in recording the data. Discussing it more specifically, according to the special OPC strategy for 6×, the pulse width of the pulse for recording the data of the "3T pattern" is reduced from 15 ns to 10 ns (i.e. to about 67%). Moreover, the pulse width of the pulse for recording the data of the "5T pattern" is reduced from 30 ns to 25 ns (i.e. to about 83%). On the other hand, according to the special OPC strategy for 4×, the pulse width of the pulse for recording the data of the "3T pattern" is reduced from 20 ns to 10 ns (i.e. to about 50%). Moreover, the pulse width of the pulse for recording the data of the "5T pattern" is reduced from 40 ns to 30 ns (i.e. to about 75%).

In other words, in any cases, on the basis of the special OPC strategy, the pulse width is changed so as to get closer to the pulse width defined by the recording strategy for 8×, than to the pulse width defined by the original recording strategy used in recording the data. In particular, in the data of the "3T pattern" which is a short pattern, the laser beam is irradiated with the same pulse width as the pulse width used in recording the data at the recording speed of 8× originally. To put it more specifically, the special OPC strategy for 4× and the special OPC strategy for 6× are defined such that the pulse width of the data of a relatively short pattern (e.g. the "3T pattern" or the like) changes to be relatively shorter and that the pulse width of the data of a relatively long pattern (e.g. the "11T pattern" or the like) changes not to be as short as the change in the data of the relatively short pattern.

As described above, it is possible to record the OPC pattern at the recording speeds of 4× and 6×, by using the pulse width which is the same as, substantially the same as or approximate to the pulse shape defined by the recording strategy for 8×. Moreover, at this time, the amplitude of the waveform of the laser beam defined by the recording strategy for 8× shown in FIG. 6(a) is preferably the same or substantially the same as the amplitude of the waveform of the laser beam defined by the recording strategy for 4× and the recording strategy for 6×, respectively shown in FIG. 6(b) and FIG. 6(c). Namely, the OPC process is preferably performed with the laser power which is the same or substantially the same as the laser power when the data is actually recorded at the recording speed of 8×.

Next, the results of the OPC process performed by using the special OPC strategy for 4× and the special OPC strategy for 6× will be discussed with reference to FIG. 7. FIG. 7 are graphs showing data obtained as the result of the OPC process.

Figure 7A:
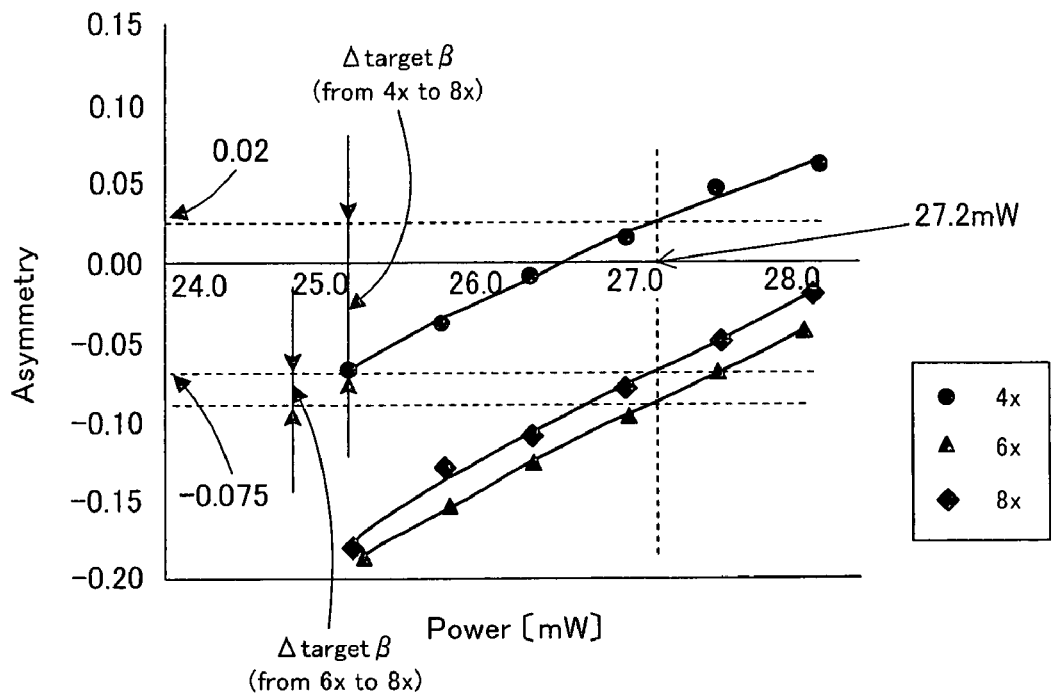
FIG. 7 are graphs showing data obtained as results of the OPC process performed by using special OPC strategies on the information recording/reproducing apparatus in the example.

FIG. 7(a) shows the graph resulted from the OPC performed by using the special OPC strategy for 4× at the recording speed of 4× and the graph resulted from the OPC performed by using the special OPC strategy for 6× at the recording speed of 6×.

As described above, by changing such that the pulse width of the data of a relatively short pattern changes to be relatively shorter and that the pulse width of the data of a relatively long pattern changes not to be as short as the change in the data of the relatively short pattern, the graphs resulted from the OPC performed by using the special OPC strategy for 4× and the special OPC strategy for 6× are shifted to the right in FIG. 7(a) with respect to a power axis. In other words, it is possible to obtain the result of the OPC, in a range substantially equal to the actual emission power of the optimum laser power in the recording speed of 8×.

Here, in order to obtain the optimum recording laser power for the recording speed of 8×, a target asymmetry value, i.e. a target β, is set. The target β is an asymmetry value which realizes the optimum laser power for the recording speed of 8× (particularly, the laser power actually emitted).

Explaining it with specific numerical values, if the target β of the optimum laser power for the recording speed of 8× is "−0.075", the target β at the recording speed of 4× is "0.02" and the target β at the recording speed of 6× is "−0.1", obtained from the graphs shown in FIG. 7(a). Therefore, the optimum laser power for the 8× can be calculated as "27.2wW" which realizes the target β="0.02" at the recording speed of 4× and which realizes the target β="−0.1" at the recording speed of 6×, from the graphs shown in FIG. 7(a).

As described above, by using the special OPC strategy for 4× and the special OPC strategy for 6× which define the pulse width substantially equal to that of the recording strategy for 8×, it is possible to perform the OPC process by using the laser beam with the laser power which is the same as the actual emission power at the recording speed of 8× and with the same pulse width. Therefore, it is possible to reduce or eliminate error of the optimum laser power, caused by a change in the characteristic between a current value to be inputted to the optical pickup 352 and the power of the laser beam actually emitted from the optical pickup 352. As a result, it is possible to calculate the optimum laser power for the recording speed of 8×, properly and highly accurately, by recording the OPC pattern at the recording speeds of 4× and 6×.

In particular, even if the information recording apparatus 300 for performing the OPC process is changed, even if the OPC process is performed with different emission powers, or even if the optical pickup 352 secularly changes, it is possible to uniform the value of the target β, by performing the OPC process using the special OPC strategy for 4× and the special OPC strategy for 6×. Moreover, it is also possible to set a Δ target β (from 4× to 8×) or a Δ target β (from 6× to 8×) to be 0, wherein the Δ target β (from 4× to 8×) is a difference between the targets β of the recording speeds of 4× and 8× and the Δ target β (from 6× to 8×) is a difference between the targets β of the recording speeds of 6× and 8×. This indicates that there is such a great advantage that the optimum laser power for the recording speed of 8× can be calculated without relying on a drive or the like.

Figure 7B:
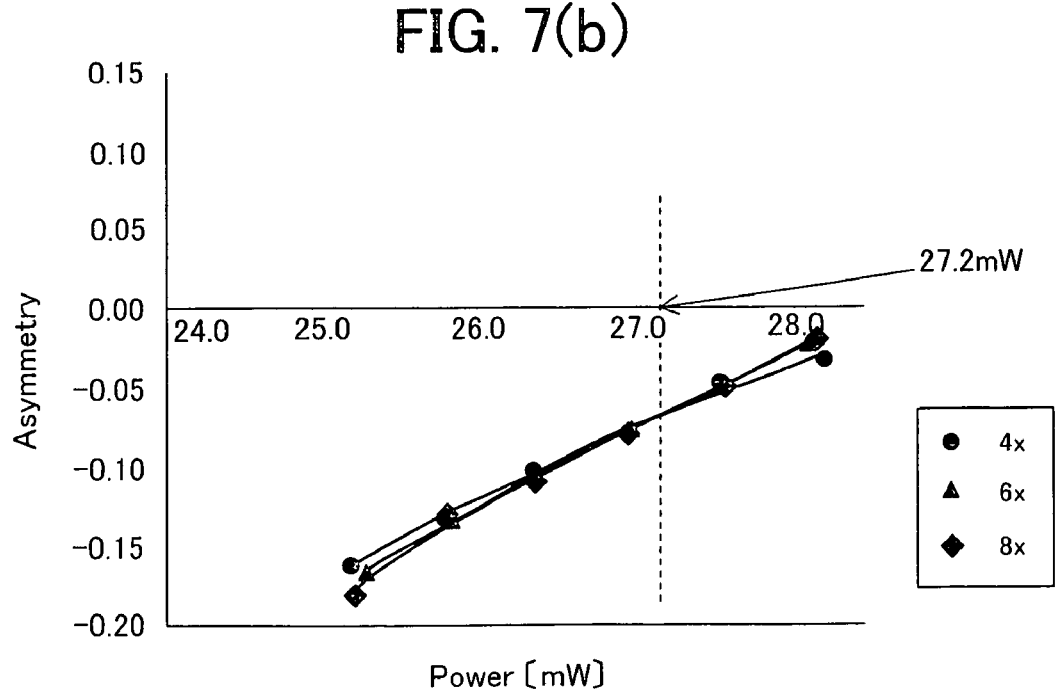

Moreover, by adjusting the special OPC strategy for 4× and the special OPC strategy for 6× (specifically, by changing the pulse width of the laser beam), it is also possible to perform the OPC process such that the result of the OPC at the recording speed of 4× has substantially the same graph as the result of the OPC at the recording speed of 6×, as shown in FIG. 7(b). In other words, the above-mentioned Δ target β value can be changed by adjusting the special OPC strategy.

Incidentally, even without relying on the method explained in the example, it is possible to perform the OPC process by using the recording strategy for 4× and the recording strategy for 6×, and from the result, it is also possible to calculate the optimum laser power for the recording speed of 8×. In this case, however, since the recording strategy for 4× and the recording strategy for 6× are strategies determined without consideration of the recording speed of 8×, the laser power in performing the OPC process also greatly differs from the laser power for recording the data at the recording speed of 8×. Thus, although the optimum laser power which is just as a prediction can be calculated, the accuracy is not necessarily high, depending on the change in the characteristic or the like.

This will be explained specifically with reference to FIG. 8. FIG. 8 are graphs showing the optimum laser power at the recording speed of 8×.

Figure 8A:
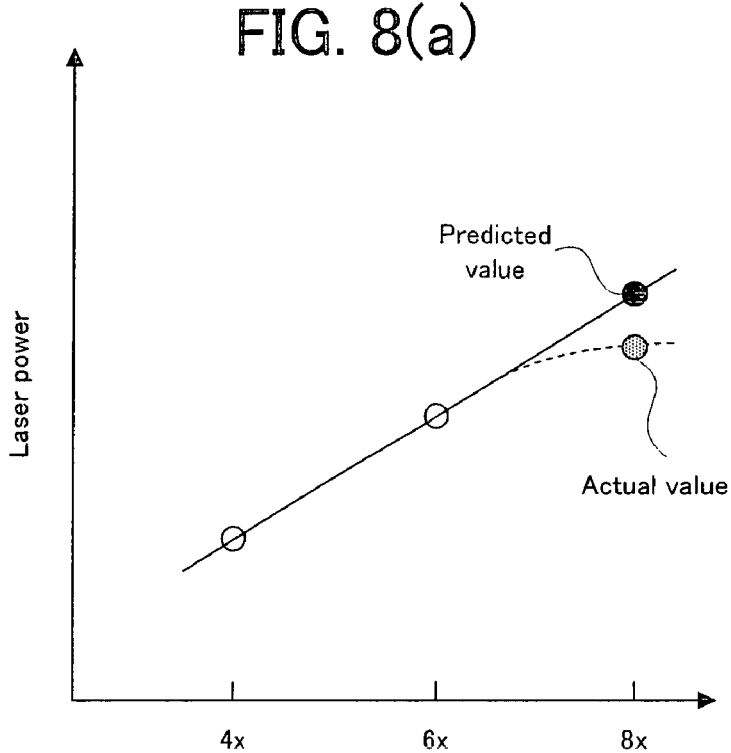
FIG. 8 are graphs showing an optimum laser power in a recording speed of 8× when the OPC process is performed at recording speeds of 4× and 6×.
Figure 8B:
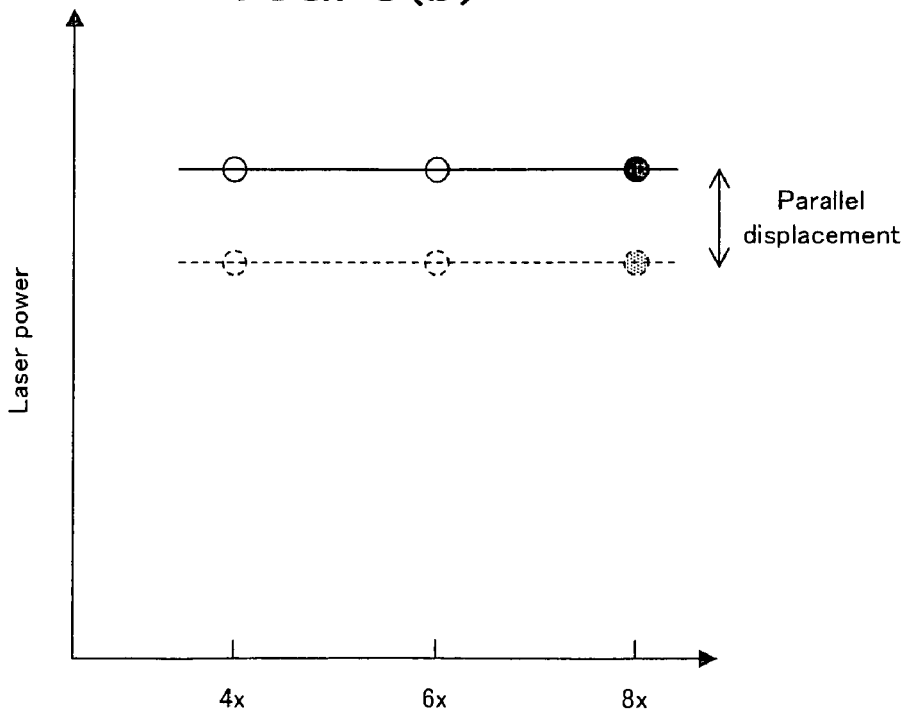

As shown in FIG. 8(a), the OPC process by the prediction has such a problem that it cannot properly correspond to the case in which the characteristic changes as shown in a dashed line. According to the example, however, as shown in FIG.

8(*b*), the optimum laser power for the recording speeds of 8× obtained by the OPC process at the recording speeds of 4× and 6× has substantially the same value as the actual optimum laser power for the recording speed of 8×. Then, even if the information recording apparatus 300 for performing the OPC process is changed or even if the optical pickup 352 secularly changes, the graph is only displaced in parallel, as shown in FIG. 8(*b*). Namely, even in this case, the optimum laser power for the recording speed of 8× has substantially the same value as the actual optimum laser power at the recording speed of 8×. This is because the special OPC strategy for 4× and the special OPC strategy for 6× which define the same pulse width as the recording strategy for 8× are used. By this, there is such a great advantage that it is possible to properly calculate the optimum laser power for the recording speed of 8×, regardless of the change in the characteristic. In other words, the optimum laser power calculated at the recording speed of 4× (or 6×) can be used as the optimum laser power for the recording speed of 8× as it is, which is a great advantage that cannot be realized in the conventional OPC process.

In FIG. 3 again, the optical pickup 352 is controlled by the control of the CPU 354, as one specific example of the "controlling device" of the present invention, such that the laser beam is irradiated with the optimum laser power obtained in the step S102 or the step S103 (step S104). Then, the data is recorded, by using the recording strategy for 1× and by using the optimum laser power calculated in the step S102 or the step S103 (step S105).

Then, it is judged whether or not the recording operation is ended, under the control of the CPU 354 (step S106). Namely, it is judged whether or not the data to be recorded in the recording operation is all recorded, or whether or not an instruction to end the recording operation is given by a user.

As a result of the judgment, if it is judged that the recording operation is ended (the step S106: Yes), the recording operation is ended. On the other hand, if it is judged that the recording operation is not ended (the step S106: No), the operational flow returns to the step S105 again to continue the recording operation. At this time, it may be constructed such that the operational flow returns to the step S101 again to perform the OPC process. In particular, if the rotational speed (or linear velocity or the like) of the optical disc 100 is changed in the middle of the recording operation, or in similar cases, the operational flow preferably returns to the step S101 again to perform the OPC process again.

As explained above, according to the information recording/reproducing apparatus in the example, even if the OPC process is not actually performed at the recording speed of 8×, it is possible to calculate the optimum laser power for the recording speed of 8×, by performing the OPC process at the recording speeds of 4× and 6×. In particular, with an increase in the recording speed, the rotational speed of the optical disc 100 also becomes high-speed. Thus, the rotational speed cannot be realized, particularly on the inner circumferential side of the optical disc. Even if the rotational speed is realized, since it causes the damage of the optical disc 100, an unstable servo or a reduction in the detection accuracy of the target $\beta$, there is a possibility that the OPC process cannot be properly performed. The example solves the disadvantages described above, and has such a great advantage that even if the recording speed becomes high-speed, it is possible to calculate the optimum laser power for the high recording speed by performing the OPC process at a lower recording speed.

Incidentally, in the above-mentioned example, the OPC process is performed at the lower recording speed of 4× in order to calculate the optimum laser power for the higher recording speed of 8×. However, obviously, it is also possible to perform the OPC process at the higher recording speed of 8× and by using the special OPC strategy for 8×, in the same manner. Namely, it is possible to obtain the optimum laser power for the recording speed of 4× by performing the OPC process at the recording speed of 8× higher than the actual recording speed of 4× for recording the data. In addition, in this case, since the OPC pattern can be recorded at the recording speed of 8× which is relatively high-speed, there is also such an advantage that a time length required for the calculation of the optimum laser power can be reduced.

In the above-mentioned examples, the optical disc 100 is explained as one example of the information recording medium, and the recorder related to the optical disc 100 is explained as one example of the information recording apparatus. The present invention, however, is not limited to the optical disc and the recorder thereof, and can be applied to other various information recording media and recorders thereof that support high-density recording or a high transfer rate.

The present invention is not limited to the above-described examples, and various changes may be made, if desired, without departing from the essence or spirit of the invention which can be read from the claims and the entire specification. An information recording/reproducing apparatus, an information recording/reproducing method, and an information recording medium and the like, all of which involve such changes, are also intended to be within the technical scope of the present invention.

INDUSTRIAL APPLICABILITY

The information recording apparatus, the information recording method, the computer program, and the information recording medium according to the present invention can be applied to a high-density optical disc in which various information can be recorded at high density, for consumer use or for commercial use, and also applied to a recorder or a player or the like associated with the optical disc. Moreover, they can be applied to an information recording medium, a recording or reproducing apparatus or the like which is mounted on various computer equipment for consumer use or for commercial use, or which can be connected to various computer equipment.

The invention claimed is:

1. An information recording apparatus comprising:
a recording device for irradiating an information recording medium with laser light and for recording information onto the information recording medium;
an obtaining device for obtaining at least one of (i) a special OPC strategy for defining a waveform of the laser light used to calculate, at a first recording speed, an optimum laser power of the laser light for recording the information at a second recording speed different from the first recording speed, and (ii) a recording strategy for defining a waveform of the laser light used to record the information at the second recording speed;
a power calculating device for calculating the optimum laser power by using the special OPC strategy at the first recording speed; and
a controlling device for controlling said recording device to record the information at the second recording speed, by using the calculated optimum laser power and the recording strategy.

2. The information recording apparatus according to claim 1, wherein
said power calculating device calculates the optimum laser power by recording a test-writing pattern for calculating the optimum laser power, and
the special OPC strategy makes the waveform of the laser light for recording the test-writing pattern at the first recording speed, shorter than the waveform of the laser light for recording the information at the first recording speed.

3. The information recording apparatus according to claim 2, wherein the special OPC strategy makes a percentage to shorten the waveform of the laser light for recording the test-writing pattern having a relatively short length, larger than a percentage to shorten the waveform of the laser light for recording the test-writing pattern having a relatively long length, on the basis of a length of the test-writing pattern recorded on the information recording medium.

4. The information recording apparatus according to claim 1, wherein the second recording speed is faster than the first recording speed.

5. The information recording apparatus according to claim 1, wherein an amplitude of the waveform defined by the special OPC strategy is the same as an amplitude of the waveform defined by the recording strategy.

6. An information recording method comprising:
a recording process of irradiating an information recording medium with laser light and of recording information onto the information recording medium;
an obtaining process of obtaining at least one of (i) a special OPC strategy for defining a waveform of the laser light used to calculate, at a first recording speed, an optimum laser power of the laser light for recording the information at a second recording speed different from the first recording speed, and (ii) a recording strategy for defining a waveform of the laser light used to record the information at the second recording speed;
a power calculating process of calculating the optimum laser power by using the special OPC strategy at the first recording speed; and
a controlling process of controlling said recording device to record the information at the second recording speed, by using the calculated optimum laser power and the recording strategy.

7. A computer readable recording medium with a computer program recorded thereon for tangibly embodying a program of instructions executable by a computer provided for an information recording apparatus, to make the computer function as at least one portion of a recording device, an obtaining device, a power calculating device and a controlling device, said information recording apparatus comprising:
said recording device for irradiating an information recording medium with laser light and for recording information onto the information recording medium;
said obtaining device for obtaining at least one of (i) a special OPC strategy for defining a waveform of the laser light used to calculate, at a first recording speed, an optimum laser power of the laser light for recording the information at a second recording speed different from the first recording speed, and (ii) a recording strategy for defining a waveform of the laser light used to record the information at the second recording speed;
said power calculating device for calculating the optimum laser power by using the special OPC strategy at the first recording speed; and
said controlling device for controlling said recording device to record the information at the second recording speed, by using the calculated optimum laser power and the recording strategy.

8. An information recording medium comprising:
a data recording area to record therein information; and
a control area to record therein at least a special OPC strategy for defining a waveform of the laser light used to calculate, at a first recording speed, an optimum laser power of the laser light for recording the information at a second recording speed different from the first recording speed.

9. The information recording medium according to claim 8, wherein:
a usual OPC strategy for defining a waveform of the laser light used to calculate an optimum laser power of the laser light for recording the information at the first recording speed is recorded in said control area.

10. The information recording medium according to claim 8 wherein
a recording strategy for defining a waveform of the laser light used to record the information at the second recording speed is recorded in said control area.

* * * * *

UNITED STATES PATENT AND TRADEMARK OFFICE
CERTIFICATE OF CORRECTION

PATENT NO. : 7,609,595 B2
APPLICATION NO. : 10/577774
DATED : October 27, 2009
INVENTOR(S) : Horikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 415 days.

Signed and Sealed this

Twelfth Day of October, 2010

David J. Kappos
*Director of the United States Patent and Trademark Office*